US012671047B2

(12) United States Patent
Yan et al.

(10) Patent No.: US 12,671,047 B2
(45) Date of Patent: Jun. 30, 2026

(54) RELAY

(71) Applicant: HUAWEI TECHNOLOGIES CO., LTD., Shenzhen (CN)

(72) Inventors: Guangchao Yan, Dongguan (CN); Enyuan Dong, Dalian (CN); Zhuo Tang, Dongguan (CN); Yongxing Wang, Dalian (CN); Gongrun Wang, Dalian (CN); Xiaozhi Sun, Yueqing (CN); Lifan Zhang, Dalian (CN); Shutian Xue, Dalian (CN); Yuqiang Pi, Dongguan (CN); Zhiming Xiao, Dongguan (CN); Liangqiang Peng, Yueqing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 18/327,250

(22) Filed: Jun. 1, 2023

(65) Prior Publication Data

US 2023/0317391 A1 Oct. 5, 2023

Related U.S. Application Data

(63) Continuation of application No. PCT/CN2021/135380, filed on Dec. 3, 2021.

(30) Foreign Application Priority Data

Dec. 3, 2020 (CN) ........................ 202011396222.1

(51) Int. Cl.

*H01H 51/01* (2006.01)
*H01H 50/18* (2006.01)

(Continued)

(52) U.S. Cl.

CPC ............ *H01H 50/36* (2013.01); *H01H 50/18* (2013.01); *H01H 50/44* (2013.01); *H01H 50/64* (2013.01);

(Continued)

(58) Field of Classification Search

CPC ........ H01H 50/36; H01H 50/18; H01H 50/64; H01H 51/01

(Continued)

(56) References Cited

U.S. PATENT DOCUMENTS

| | | | | |
|---|---|---|---|---|
| 2,661,412 A * | 12/1953 | Dreyfus | H01H 53/015 | 335/148 |
| 4,855,701 A * | 8/1989 | Yokoyama | H01H 51/2209 | 335/230 |

(Continued)

FOREIGN PATENT DOCUMENTS

| | | |
|---|---|---|
| CN | 104217903 B | 10/2016 |
| CN | 109003866 A | 12/2018 |

(Continued)

*Primary Examiner* — Alexander Talpalatski
(74) *Attorney, Agent, or Firm* — Rimon PC

(57) ABSTRACT

A relay is disclosed to enhance a retention force. The relay includes a yoke iron, a top cover, a static iron core, a primary permanent magnet group, a secondary permanent magnet group, a first movable iron core, and a second movable iron core. The top cover is provided with a first opening group. The first opening group is provided at a position at which the top cover is configured to be in contact with the first movable iron core. The first opening group includes at least one first sub-opening. The yoke iron is provided with a second opening group, the second opening group is provided at a position at which the yoke iron is configured to be in contact with the second movable iron core, and the second opening group includes at least one second sub-opening.

20 Claims, 15 Drawing Sheets

(51) Int. Cl.
*H01H 50/36* (2006.01)
*H01H 50/44* (2006.01)
*H01H 50/64* (2006.01)

(52) U.S. Cl.
CPC ....... *H01H 51/01* (2013.01); *H01H 2050/446* (2013.01)

(58) Field of Classification Search
USPC ................................. 335/129, 229–232, 131
See application file for complete search history.

(56) References Cited

U.S. PATENT DOCUMENTS

| | | | | | |
|---|---|---|---|---|---|
| 5,886,601 | A * | 3/1999 | Kitamura | H01H 50/041 335/130 |
| 9,418,811 | B2 * | 8/2016 | Sasaki | H01H 50/08 |
| 9,601,291 | B2 * | 3/2017 | Jang | H01H 50/36 |
| 2015/0187483 | A1 * | 7/2015 | Lee | H01F 7/0289 335/229 |
| 2015/0380142 | A1 * | 12/2015 | Cho | H01H 50/36 335/229 |

FOREIGN PATENT DOCUMENTS

| | | | |
|---|---|---|---|
| CN | 109192622 | A | 1/2019 |
| CN | 108417451 | B | 1/2024 |
| KR | 101098930 | B1 | 12/2011 |
| KR | 20120077142 | A | 7/2012 |

* cited by examiner

RELAY

CROSS-REFERENCE TO RELATED APPLICATIONS

This application is a continuation of International Application No. PCT/CN2021/135380, filed on Dec. 3, 2021, which claims priority to Chinese Patent Application No. 202011396222.1, filed on Dec. 3, 2020. The disclosures of the aforementioned applications are hereby incorporated by reference in their entireties.

TECHNICAL FIELD

Embodiments of this application relate generally to electric circuits, and in particular, to a relay.

BACKGROUND

With the increasing dependence of users on data, it becomes more important to avoid service interruption and data packet loss in a data center. Currently, most data centers use a hybrid power supply architecture and use a battery as backup power. The hybrid power supply architecture requires a relay. When the power supply of a data center is interrupted, the data processing progress of a large number of users will be suspended. Therefore, the relay is required to implement high-speed power supply switching and restore power supply quickly.

The relay switches a power supply status through a method in which a driving mechanism inside the relay moves to drive a movable spring plate on the relay to be in contact with a static spring plate, thereby implementing switching on the power supply status. The relay also needs to provide a retention force to keep the driving mechanism still to maintain a stable state of the power supply. In a conventional relay, a primary permanent magnet is used to provide a magnetic field for a coil, and an auxiliary permanent magnet is used to provide more electromagnetic lines for a movable iron core at a switch-off position and a movable iron core at a switch-on position, thereby improving the retention force.

However, an existing relay can improve the retention force only by relying on the primary permanent magnet and the auxiliary permanent magnet. In addition, with the primary permanent magnet and the auxiliary permanent magnet, the structure of the relay becomes complex, the installation difficulty is high, and the reliability is low.

SUMMARY

Embodiments of this application provides a relay, configured to provide a retention force by using a yoke iron and an opening on a top cover.

A coil in the relay drives a driving mechanism to move a movable spring plate on the relay to be in contact with a static spring plate, thereby implementing the switching of a power supply state of a power supply. A force ensuring that the driving mechanism does not move at a switch-off position or at a switch-on position is referred to as a retention force.

A first aspect of embodiments of this application provides a relay. The relay includes an electromagnetic mechanism, and the electromagnetic mechanism includes a yoke iron, atop cover, a static iron core, a primary permanent magnet group, and a secondary permanent magnet group. The top cover, the static iron core, the primary permanent magnet group, and the secondary permanent magnet group may be fixedly connected to the yoke iron. The relay further includes a first movable iron core and a second movable iron core. The top cover is provided with a first opening group, the first opening group is provided at a position at which the top cover is configured to be in contact with the first movable iron core, and the first opening group includes at least one first sub-opening. The yoke iron is provided with a second opening group, the second opening group is provided at a position at which the yoke iron is configured to be in contact with the second movable iron core, and the second opening group includes at least one second sub-opening. The relay further includes a coil former on which a coil is disposed. A cavity is provided inside the coil former, and the static iron core and the secondary permanent magnet group are disposed in the cavity.

In an embodiment of this application, the yoke iron is provided with the second opening group, and the top cover is provided with the first opening group, where the first opening group includes at least two sub-openings, and the second opening group also includes at least two sub-openings. In this way, a magnetic flux density between the first movable iron core and the top cover is increased, and a magnetic flux density between the second movable iron core and the yoke iron is increased, thereby enhancing a retention force.

In a possible implementation, the top cover, the static iron core, the primary permanent magnet, and the secondary permanent magnet may be affixed to the yoke iron in a riveting manner.

In an embodiment of this application, the top cover, the static iron core, the primary permanent magnet, and the secondary permanent magnet are affixed to the yoke iron through riveting. Therefore, glue is no longer required for fixing, thereby preventing generation of harmful gas and corrosion of a device.

In a possible implementation, the top cover includes a first contact part and a second contact part, the first contact part and the second contact part are configured to be in contact with the first movable iron core. The first contact part is provided with a first sub-opening group, the second contact part is provided with a second sub-opening group, the first sub-opening group includes at least one first sub-opening, the second sub-opening group includes at least one first sub-opening, and the first sub-opening group and the second sub-opening group are included in the first opening group. The yoke iron includes a third contact part and a fourth contact part. The third contact part and the fourth contact part are configured to be in contact with the second movable iron core, the third contact part is provided with a third sub-opening group. The fourth contact part is provided with a fourth sub-opening group. The third sub-opening group includes at least one second sub-opening, the fourth sub-opening group includes at least one second sub-opening, and the third sub-opening group and the fourth sub-opening group are included in the second opening group.

In a possible implementation, the primary permanent magnet group includes a first primary permanent magnet and a second primary permanent magnet. The secondary permanent magnet group includes a first secondary permanent magnet and a second secondary permanent magnet. The first secondary permanent magnet is attached to one side of the static iron core. The second secondary permanent magnet is attached to the other side of the static iron core. The first primary permanent magnet is attached to an inner wall of one side of the yoke iron and is disposed on one side of the static iron core, and the second primary permanent magnet is attached to an inner wall of the other side of the yoke iron and is disposed on the other side of the static iron core. The first primary permanent magnet and the second primary permanent magnet have a same length, and magnetic conduction directions of the first primary permanent magnet and the second permanent magnet are opposite. The first secondary permanent magnet and the second secondary permanent magnet have a same length, and magnetic conduction directions of the first secondary permanent magnet and the second secondary permanent magnet are opposite. Magnetic conduction directions of the first primary permanent magnet and the first secondary permanent magnet are the same.

In an embodiment of this application, the primary permanent magnet group and the secondary permanent magnet group provide a magnetic field for the electromagnetic mechanism. Therefore, no additional excitation time is required, and a response speed of the relay is improved.

In a possible implementation, the length of the first primary permanent magnet is greater than the length of the first secondary permanent magnet, and the length of the first secondary permanent magnet is equal to a length of the static iron core.

In an embodiment of this application, the length of the first primary permanent magnet is greater than the length of the first secondary permanent magnet, and the length of the first secondary permanent magnet is equal to the length of the static iron core. Therefore, an effective utilization area of the magnetic field can be increased.

In a possible implementation, the secondary permanent magnet group is disposed around the static iron core, and the primary permanent magnet group is disposed around the secondary permanent magnet group. Target magnetic poles of permanent magnets in the secondary permanent magnet group and the primary permanent magnet group face the static iron core, and the target magnetic poles may be “S” poles or may be “N” poles. In addition, the length of a permanent magnet in the primary permanent magnet group is greater than the length of a permanent magnet in the secondary permanent magnet group.

In an embodiment of this application, the coil may be entirely enclosed by the magnetic field provided by the primary permanent magnet group and the secondary permanent magnet group, thereby improving magnetic field utilization.

In a possible implementation, the relay further includes a driving mechanism, the driving mechanism includes the first movable iron core, the second movable iron core, the coil former, a contact mounting groove, and a contact guide rail. The first movable iron core is disposed on one side of the coil former, the second movable iron core is disposed on the other side of the coil former, and the driving mechanism is processed in an integral formation manner.

In an embodiment of this application, the driving mechanism may be processed in an integral formation manner, so that an assembly time of the relay is reduced and the transmission efficiency is improved.

In a possible implementation, the relay further includes a first driving mechanism, a second driving mechanism, and a connecting member. The first driving mechanism includes a contact mounting groove, a contact guide rail, and a first connection hole. The second driving mechanism includes the first movable iron core, the second movable iron core, the coil former, and a second connection hole. The connecting member may be connected to the first driving mechanism and the second driving mechanism by being inserted into the first connection hole and the second connection hole. A processing manner of the first driving mechanism and the second driving mechanism is integrated processing.

In an embodiment of this application, another form of the driving mechanism is limited, the assembly time of the relay is reduced, and the transmission efficiency is improved.

In a possible implementation, the relay further includes a movable spring plate and a static spring plate. The movable spring plate is of a flexible deformable material, and the static spring plate is of a rigid material.

In this embodiment of this application, a material of the movable spring plate is limited to a flexible deformable material, so that a movable contact does not bounce, and a material of the static spring plate is limited to a rigid material, so that deformation can be avoided.

A second aspect of embodiments of this application provides a relay. The relay includes an electromagnetic mechanism. The electromagnetic mechanism includes a first permanent magnet, a second permanent magnet, a magnetic conductive material housing, an insulation receptacle, a movable iron core, a first coil, and a second coil. The first coil and the second coil are fixed to the magnetic conductive material housing. The magnetic conduction directions of the first permanent magnet and the second permanent magnet are opposite. A cavity is provided inside the insulation receptacle, and a through hole is provided at the bottom. The first permanent magnet and the second permanent magnet are disposed in the cavity. The movable iron core passes through the through hole. A bottom of the movable iron core is fixedly connected to the magnetic conductive material housing, and the insulation receptacle may move along the movable iron core. The first coil and the second coil are respectively disposed on two sides of the insulation receptacle. The first coil, the second coil, the insulation receptacle, and the movable iron core are all disposed inside the magnetic conductive material housing. A top of the magnetic conductive material housing is provided with at least a first opening and a second opening, and a bottom of the magnetic conductive material housing is provided with at least a third opening and a fourth opening.

In an embodiment of this application, the electromagnetic mechanism of the relay does not need to switch an operation status of the relay by relying on coil motion, but by motion of the first permanent magnet and the second permanent magnet. Therefore, a case in which the relay becomes damaged due to a broken connection cable of the coil can be avoided. Reliability of the relay is improved, and the quantity of required permanent magnets is small, thereby reducing costs of the relay.

In a possible implementation, the relay further includes a driving mechanism. the driving mechanism includes a first movable iron core, a second movable iron core, a magnetic conductive material housing accommodating cavity, a contact mounting groove, and a contact guide rail. The first movable iron core is disposed on one side of the magnetic conductive material housing accommodating cavity, and the second movable iron core is disposed on the other side of the magnetic conductive material housing accommodating cavity. The driving mechanism uses integrated processing.

In an embodiment of this application, the driving mechanism may be processed in an integral formation manner, so that an assembly time of the relay is reduced, and the transmission efficiency of the relay is improved.

In a possible implementation, the relay further includes a first driving mechanism, a second driving mechanism, and a connecting member. The first driving mechanism includes the contact mounting groove, the contact guide rail, and a first connection hole. The second driving mechanism includes the first movable iron core, the second movable iron core, the magnetic conductive material housing accommodating cavity, and a second connection hole. The connecting member may be connected to the first driving mechanism and the second driving mechanism by being inserted into the first connection hole and the second connection hole. A processing manner of the first driving mechanism and the second driving mechanism is integrated processing.

In an embodiment of this application, the driving mechanism may be processed in an integral formation manner, so that an assembly time of the relay is reduced, and the transmission efficiency of the relay is improved.

In a possible implementation, the relay further includes a movable spring plate and a static spring plate. The movable spring plate is of a flexible deformable material, and the static spring plate is of a rigid material.

In an embodiment of this application, a material of the movable spring plate is limited to flexible deformable materials, so that a movable contact does not bounce easily, and a material of the static spring plate is limited to rigid materials, so that deformation is not easy to occur.

A third aspect of embodiments of this application provides a power distribution box. The power distribution box includes a driving board, the power distribution box is configured to dispose the relay according to the foregoing first aspect, and the driving board is configured to supply power to a coil of the relay according to the foregoing first aspect.

A fourth aspect of embodiments of this application provides a communication device. The communication device includes the power distribution box according to the foregoing third aspect and an electric device, and the power distribution box is configured to switch a power status of the electric device.

DESCRIPTION OF EMBODIMENTS

Embodiments of this application provide a relay, to improve a speed of switching a power supply by the relay.

The following describes technical solutions in embodiments of this application with reference to accompanying drawings in embodiments of this application. It is clear that the described embodiments are merely some but not all of embodiments of this application. All other embodiments obtained by a person skilled in the art based on embodiments of this application without creative efforts shall fall within the protection scope of this application.

Figure 1:
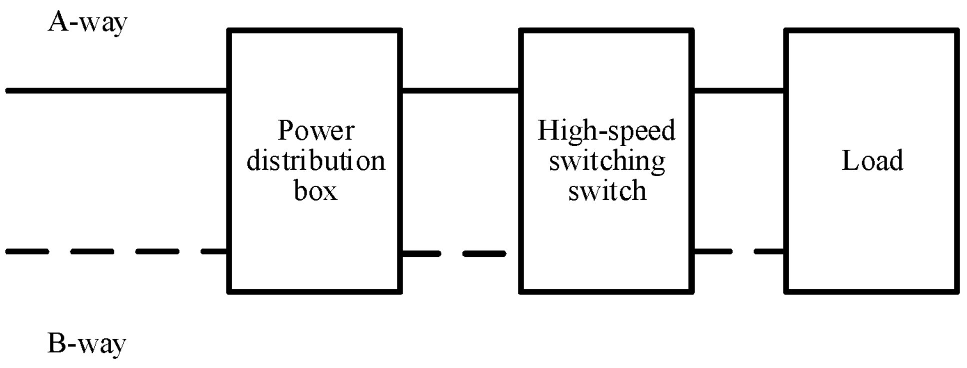
FIG. 1 is a schematic diagram of a dual-power supply hybrid power supply scenario according to an embodiment of this application.

The relay provided in this application may be used in a dual-channel hybrid power supply scenario of a high-security-level device such as a data center, a public cloud server, or a switch. Currently, most data centers use a highly reliable hybrid power supply architecture, and rely a battery for backup power. A multi-backup power distribution architecture can make an energy efficiency indicator of a data center to reach an ideal value. With reference to FIG. 1. FIG. 1 is a schematic diagram of a hybrid power supply scenario. An A-way power supply and a B-way power supply achieve a high-speed switching through a power distribution box. The high-speed switching switches the A-way power supply and the B-way power supply according to an actual power condition, and then transmits the electric power of the A-way power supply or the electric power of the B-way power supply to a load, thereby ensuring security and stability of a power supply system. The relay in embodiments of this application may be used in the high-speed switching switch shown in the figure. A power supply switching time is very important to a direct current hybrid power supply architecture or a high-voltage alternating current hybrid power supply architecture. The length of the power supply switching time directly affects stable running of a communication device, and directly determines power supply continuity of the communication device.

The following describes the relay in embodiments of this application.

Refer to FIG. 2, FIG. 3*a*, FIG. 3*b*, and FIG. 3*c*. An electromagnetic mechanism of a relay in an embodiment of this application includes a yoke iron (b), a first primary permanent magnet (g), a second primary permanent magnet (g), a first secondary permanent magnet (e), a second secondary permanent magnet (e), and a static iron core (c). The first primary permanent magnet (g) and the second primary permanent magnet (g) belong to a primary permanent magnet group. The first secondary permanent magnet (e) and the second secondary permanent magnet (e) belong to a secondary permanent magnet group. The static iron core (c) may be an independent iron core, or may be formed by a plurality of iron cores. (For example, the static iron core is formed by two single iron cores in FIG. 2, FIG. 3*a*, FIG. 3*b*, and FIG. 3*c*). The first secondary permanent magnet (e) is attached to one side of the static iron core (c), and the second secondary permanent magnet (e) is attached to the other side of the static iron core (c). The first primary permanent magnet (g) is disposed on one side of the static iron core (c) and is attached to an inner wall of one side of the yoke iron (b). The second primary permanent magnet (g) is disposed on the other side of the static iron core (c) and is attached to an inner wall of the other side of the yoke iron (b). The first primary permanent magnet (g) and the second primary permanent magnet (g) have a same length. Magnetic conduction directions of the first primary permanent magnet (g) and the second primary permanent magnet (g) are opposite. The first secondary permanent magnet (e) and the second secondary permanent magnet (e) have a same length. Magnetic conduction directions of the first secondary permanent magnet (e) and the second secondary permanent magnet (e) are opposite. The length of the first primary permanent magnet (g) is greater than the length of the first secondary permanent magnet (e). Magnetic conduction directions of the first primary permanent magnet (g) and the first secondary permanent magnet (e) are the same, and the secondary permanent magnet (e) and the static iron core (c) have a same length.

It should be noted that, in an actual application, the length of the first primary permanent magnet (g) may also be less than or equal to the length of the first secondary permanent magnet (e), and the secondary permanent magnet (e) and the static iron core (c) may also have different lengths. This is not specifically limited herein.

Figure 2:
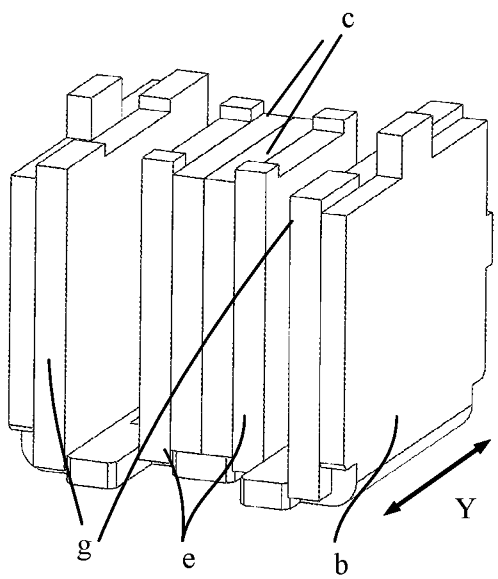
FIG. 2 is a schematic diagram of a structure of an electromagnetic mechanism according to an embodiment of this application.

It should be noted that, a direction to which an arrow "Y" in FIG. 2 points is the foregoing length direction, a length direction of the permanent magnet.

Figure 3A:
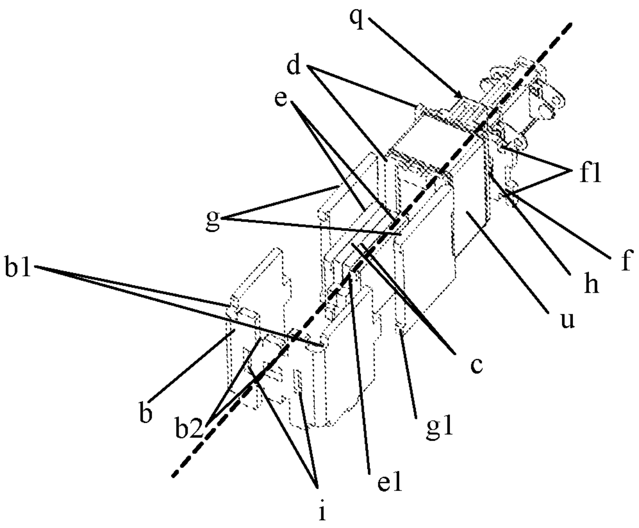
FIG. 3*a* is a schematic diagram of assembly of an electromagnetic mechanism and a driving mechanism according to an embodiment of this application.

Refer to FIG. 3*a*. FIG. 3*a* is a schematic diagram of an assembly of the electromagnetic mechanism and a driving mechanism (q). As shown in FIG. 3*a*, the first secondary permanent magnet (e) and the second secondary permanent magnet (e) are riveted to a groove (b2) on the yoke iron by using a first boss (e1) that is provided. The first primary permanent magnet (g) and the second primary permanent magnet (g) are riveted to a second groove (b1) on the yoke iron by using a second boss (g1) that is provided. In an embodiment of this application, the electromagnetic mechanism further includes a top cover (f). The first primary permanent magnet (g) and the second primary permanent magnet (g) may be riveted to a first groove (f1) on the top cover by using the second boss (g1) that is disposed on the top, and a coil (u) is disposed on the driving mechanism (q). Because riveting is used as the fixing manner, glue is no longer required for bonding and fixing, thereby avoiding generation of harmful gas that may corrode a device.

Figure 3B:
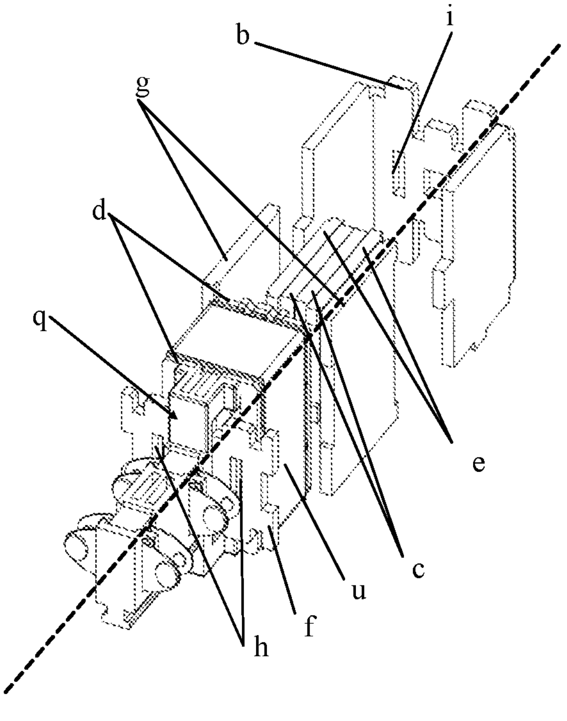
FIG. 3*b* is a schematic diagram of assembly of an electromagnetic mechanism and a driving mechanism from another perspective according to an embodiment of this application.

Refer to FIG. 3*b*. FIG. 3*b* is another schematic diagram of an assembly of the electromagnetic mechanism and the driving mechanism (q). During assemblying, the top cover (f) may first pass through the driving mechanism (q) at a position shown in FIG. 3*b*, and then be riveted to the yoke iron (b), the first primary permanent magnet (g), and the second primary permanent magnet (g).

Figure 3C:
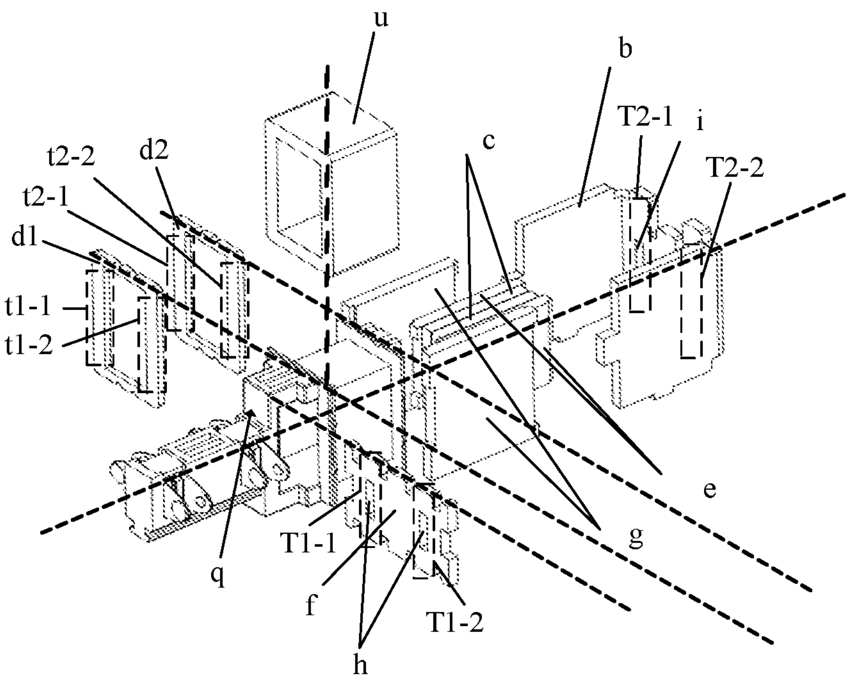
FIG. 3*c* is a schematic diagram of assembly of an electromagnetic mechanism and a driving mechanism from another perspective according to an embodiment of this application.

Refer to FIG. 3*c*. FIG. 3*c* is another schematic diagram of an assembly of the electromagnetic mechanism and the driving mechanism (q). A first movable iron core (d) and a second movable iron core (d) may be disposed at positions of the driving mechanism (q) shown in the figure, and an assembly manner of another part is not described herein again.

The foregoing describes the electromagnetic mechanism of the relay in embodiments of this application, and the following describes the driving mechanism in embodiments of this application.

Figure 4:
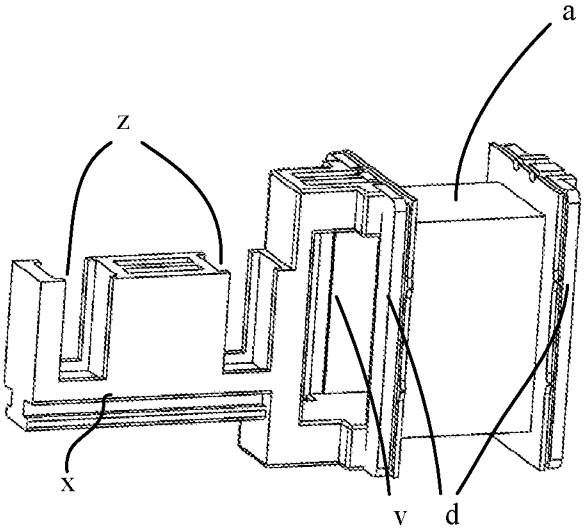
FIG. 4 is a schematic diagram of a structure of a driving mechanism according to an embodiment of this application.
Figure 5:
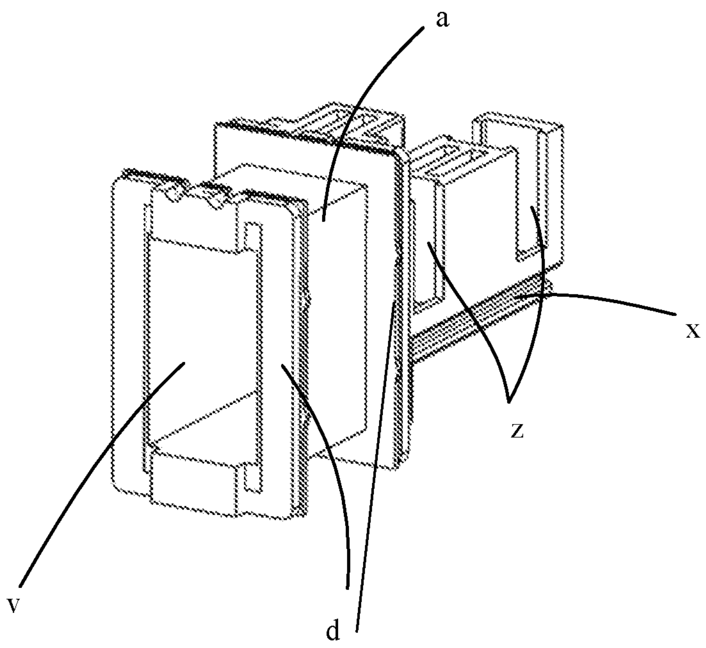
FIG. 5 is a schematic diagram of a structure of a driving mechanism from another perspective according to an embodiment of this application.

Refer to FIG. 4. The driving mechanism (q) of the relay in an embodiment of this application includes a coil former (a), the first movable iron core (d), the second movable iron core (d), a contact mounting groove (z), and a contact guide rail (x). Refer to FIG. 5. FIG. 5 is another view of the driving mechanism. As shown in FIG. 5, an inner part of the coil former (a) is a cavity (v). In the driving mechanism, the coil former (a) may be configured to dispose the coil (u), the cavity (v) may provide positioning for a push rod, be a part of an inner guide rail, and simultaneously limit deviation of a contact guide rail side; and the contact mounting groove (z) may provide a mounting limit for a movable contact assembly (2*g*), and the contact guide rail (x) may provide guidance for a contact side of the push rod.

Figure 6:
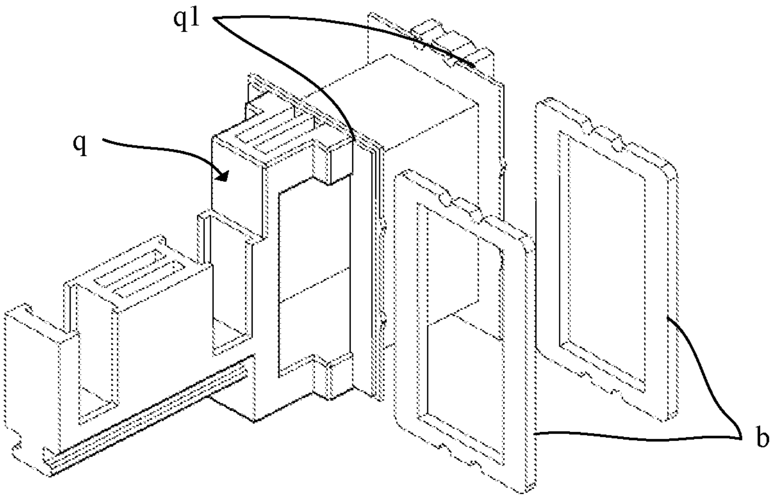
FIG. 6 is a schematic diagram of assembly of a driving mechanism according to an embodiment of this application.

It should be noted that, to resolve disadvantages of a driving mechanism of a relay in the conventional technologies, a large quantity of connecting rods and low transmission efficiency and the driving mechanism of the relay may be integrally formed, to greatly reduce required transmission parts. Specifically, refer to FIG. 6. FIG. 6 is a schematic diagram of an assembly of the driving mechanism of the relay according to an embodiment of this application. As shown in FIG. 6, an injection molding mold may be used to process the driving mechanism (q), so that no additional assembly is required. By fixing the first movable iron core (d) and the second movable iron core (d) at corresponding positions of mounting grooves (q1) in the injection molding mold, and performing one-time injection molding, the driving mechanism in an embodiment of this application can be obtained. Through the processing method, the mounting gap between components can be reduced, power transmission efficiency can be effectively improved, system loss can be reduced, and motion precision can be improved.

Figure 7:
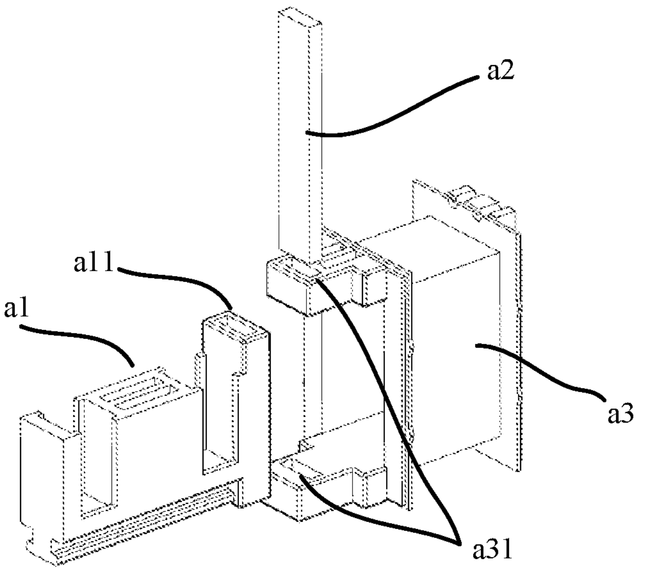
FIG. 7 is a schematic diagram of another assembly of a driving mechanism according to an embodiment of this application.

Alternatively, for the driving mechanism, a first driving mechanism and a second driving mechanism are integrally formed independently, and then the first driving mechanism and the second driving mechanism are connected and fixed to obtain the driving mechanism. Refer to FIG. 7. FIG. 7 is a schematic diagram of another assembly of the driving mechanism of the relay according to an embodiment of this application. As shown in FIG. 7, the driving mechanism may include a first driving mechanism (a1), a second driving mechanism (a3), and a connecting member (a2). The driving mechanism can be assembled by inserting the second connecting member (a2) into a second rectangular connection hole (a31) on the second driving mechanism (a3) and a first rectangular connection hole (a11) on the first driving mechanism (a1). It should be noted that the connecting member (a2) may be a pin.

The foregoing respectively describes the electromagnetic mechanism and the driving mechanism of the relay in embodiments of this application. The following describes an assembly relationship between the electromagnetic mechanism and the driving mechanism.

Figure 8:
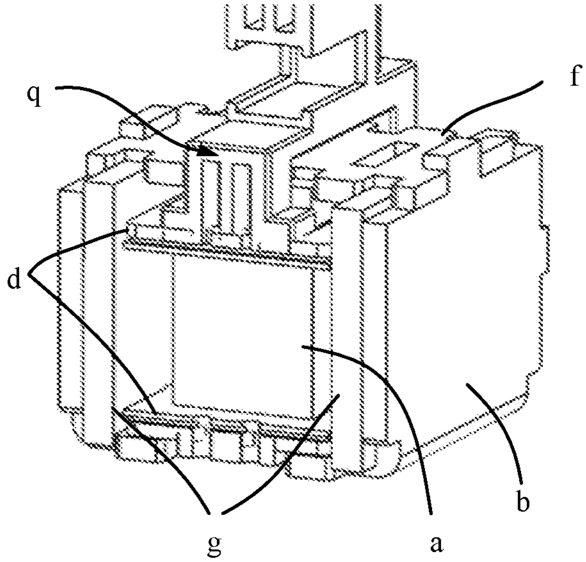
FIG. 8 is a schematic diagram of assembly of an electromagnetic mechanism and a driving mechanism according to an embodiment of this application.

Refer to FIG. 8. FIG. 8 is a schematic diagram of an assembly relationship between the electromagnetic mechanism and the driving mechanism of the relay according to this embodiment of this application. As shown in FIG. 8, the top cover (f) is fixedly connected to the yoke iron and the driving mechanism (q). An inner part of the cavity (v) is configured to receive the static iron core (c), the first secondary permanent magnet (e), and the second secondary permanent magnet (e).

Figure 9:
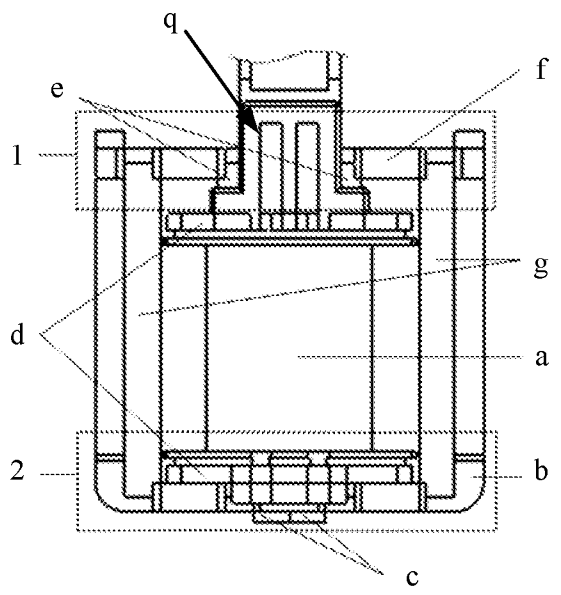
FIG. 9 is a schematic diagram of assembly of an electromagnetic mechanism and a driving mechanism from another perspective according to an embodiment of this application.

Refer to FIG. 9. FIG. 9 is a schematic diagram of assembly of the electromagnetic mechanism and the driving mechanism from another perspective according to an embodiment of this application. As shown in FIG. 9, the coil former (a) may be configured to entangle the coil (u) (not shown in FIG. 9). After the coil (u) is powered on, the coil (u) moves under an action of a magnetic field generated by the first primary permanent magnet (g), the second primary permanent magnet (g), the first secondary permanent magnet (e), and the second secondary permanent magnet (e). The motion of the coil (u) may drive motion of the driving mechanism (q). When the first movable iron core (d) is attached to the top cover (f), the first secondary permanent magnet (e), the first movable iron core (d), the top cover (f), and the first primary permanent magnet (g) cooperate to provide a retention force at a position (1). When the second movable iron core (d) is attached to the yoke iron (b), the yoke iron (b), the second secondary permanent magnet (e), the second movable iron core (d), and the second primary permanent magnet (g) cooperate to provide a retention force at a position (2).

Figure 10:
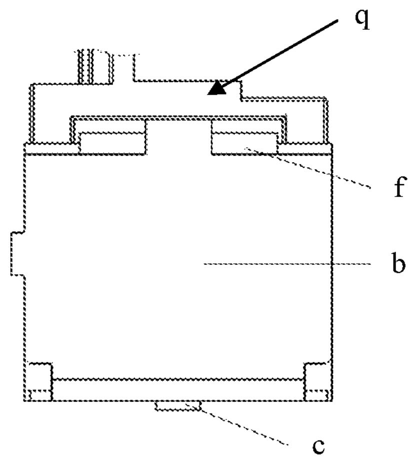
FIG. 10 is a schematic diagram of assembly of an electromagnetic mechanism and a driving mechanism from another perspective according to an embodiment of this application.

Refer to FIG. 10. FIG. 10 is a schematic diagram of cooperation between the electromagnetic mechanism and the driving mechanism from another perspective according to an embodiment of this application. A specific position relationship is consistent with that shown in FIG. 9. Details are not described herein again.

Figure 11:
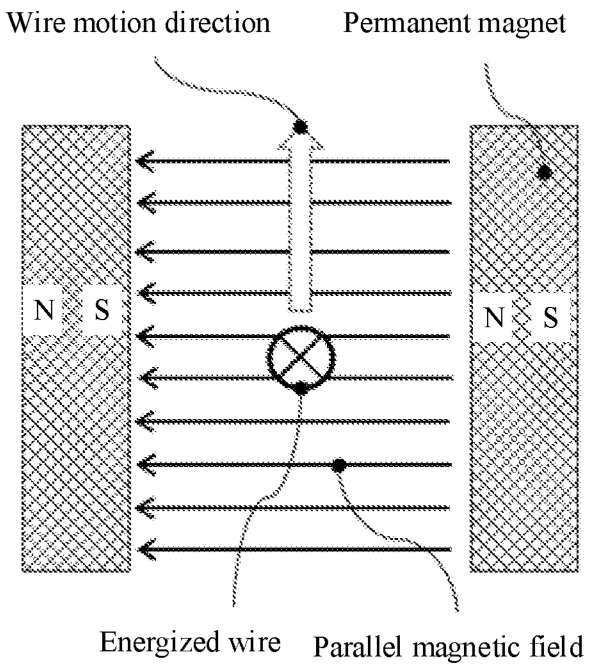
FIG. 11 is a schematic diagram of a principle of coil motion according to an embodiment of this application.

Specifically, for a principle of motion of the coil (u) on the coil former (a), refer to FIG. 11. As shown in FIG. 11, the coil (u) (not shown in FIG. 11) is an energized wire in FIG. 11. Under the action of the magnetic field provided by the permanent magnet, a current direction in the coil is changed, that is, up and down motion of the coil (u) on the coil former (a) may be changed. In addition, in an entire motion process, main motion air gap remains unchanged, which can provide stable electromagnetic output and desirable features such as long motion stroke and stable output.

Figure 12:
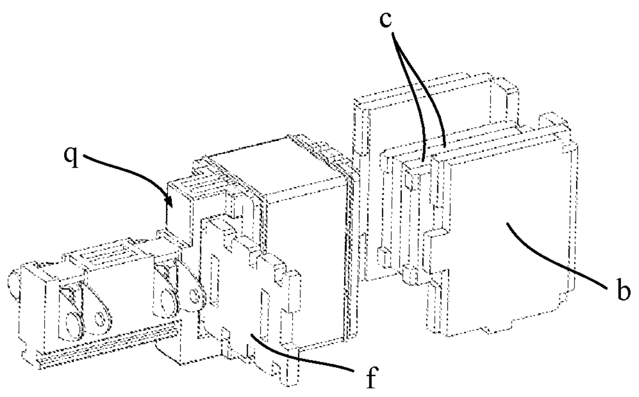
FIG. 12 is a schematic diagram before an electromagnetic mechanism and a driving mechanism are assembled according to an embodiment of this application.

Refer to FIG. 12. FIG. 12 is a schematic diagram before the electromagnetic mechanism and the driving mechanism are assembled according to an embodiment of this application. The assembly of the electromagnetic mechanism and the driving mechanism (q) may be: first, a top cover (f) is fixedly connected to the driving mechanism (q), then the driving mechanism (q) is pushed into the electromagnetic mechanism, and finally, a top cover (f) and the yoke iron (b) are riveted.

Figure 13:
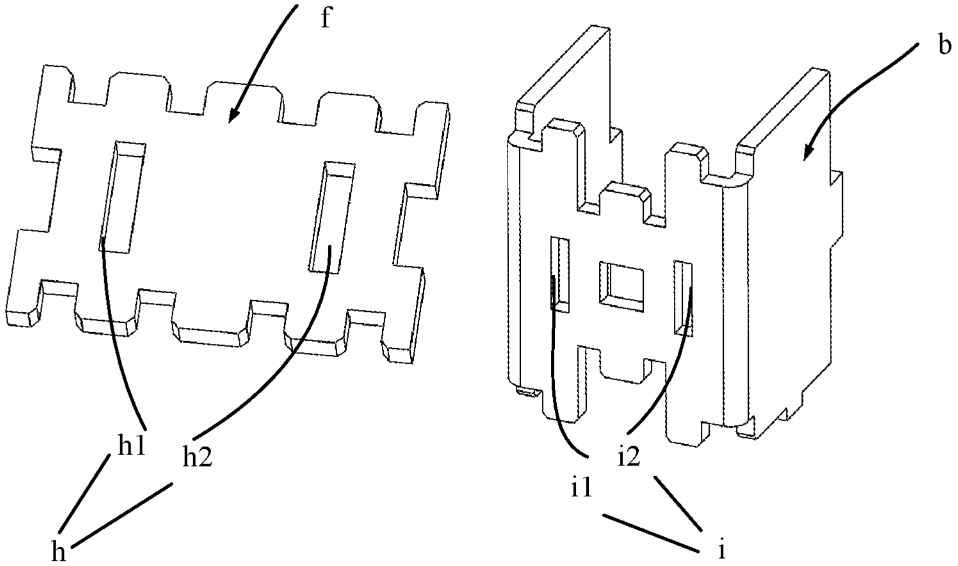
FIG. 13 is a schematic diagram of openings of a yoke iron and a top cover according to an embodiment of this application.

It should be noted that, the electromagnetic mechanism of the relay in an embodiment of this application may further adjust the retention force by using the top cover (f) and the yoke iron (b). Specifically, as the current direction in the coil (u) changes, motion of the driving mechanism (q) causes the first movable iron core (d) to be attached to the top cover (f), or causes the second movable iron core (d) to be attached to the yoke iron (b). Refer to FIG. 3*a*, FIG. 3*b*, FIG. 3*c*, and FIG. 13. The top cover (f) is provided with a first opening group (h), and the yoke iron (b) is provided with a second opening group (i), where the first opening group (h) includes a first sub-opening group (h1) and a second sub-opening group (h2). The first sub-opening group is located on a first contact part (T1-1) of the top cover (f) configured to be in contact with the first movable iron core (d1), and the second sub-opening group is located on a second contact part (T1-2) of the top cover (f) configured to be in contact with the first movable iron core (d1). Correspondingly, two corresponding contact parts (t1-1 and t1-2) on the first movable iron core (d1) are also configured to be in contact with the first contact part (T1-1) and the second contact part (T1-2) respectively. It should be noted that the contact part identified by a dash line box in FIG. 3*c* is a rough example. A person skilled in the art may determine a true contact part with reference to a relationship and magnitudes of components in the figure. Each sub-opening group may include one or more openings. For example, in FIG. 13, each sub-opening group (h1 or h2) includes one first sub-opening. A quantity of sub-opening groups may correspond to a quantity of contact parts on the first movable iron core (d1). In FIG. 3*c* and FIG. 13, because the first movable iron core (d1) has only two side contact parts (t1-1 and t1-2), only two sub-opening groups may be disposed. Certainly, only one sub-opening group may also be disposed. The first sub-opening group (h1) or the second sub-opening group (h2) may include one or more first sub-openings. In FIG. 13, each sub-opening group includes only one first sub-opening.

The second opening group (i) includes a third sub-opening group (i1) and a fourth sub-opening group (i2). The third sub-opening group (i1) is located on a third contact part (T2-1) of the yoke iron (b) configured to be in contact with the second movable iron core (d2), and the fourth sub-opening group (i2) is located on a fourth contact part (T2-2) of the yoke iron (b) configured to be in contact with the second movable iron core (d2). Correspondingly, two corresponding contact parts (t2-1 and t2-2) on the second movable iron core (d2) are also configured to be in contact with the third contact part (T2-1) and the fourth contact part (T2-2) respectively. It should be noted that, the contact part identified by the dash line box in FIG. 3c is the rough example. The person skilled in the art may determine the true contact part with reference to the relationship and magnitudes of the components in FIG. 3c. In addition, because the third contact part (T2-1) and the fourth contact part (T2-2) are blocked by the yoke iron (b) in FIG. 3c, the person skilled in the art may understand specific positions of the third contact part and the fourth contact part with reference to another accompanying drawing (for example, FIG. 3a). Each sub-opening group may include one or more openings. For example, in FIG. 13, each sub-opening group (i1 or i2) includes one second sub-opening. A quantity of sub-opening groups may correspond to a quantity of contact parts. In FIG. 3c and FIG. 13, because the second movable iron core (d2) has only two side contact parts (t2-1 and t2-2), only two sub-opening groups may be disposed on the yoke iron (b). Certainly, only one sub-opening group may also be disposed. The third sub-opening group (i1) or the fourth sub-opening group (i2) may include one or more second sub-openings. In FIG. 13, each sub-opening group includes only one second sub-opening.

Figure 14:
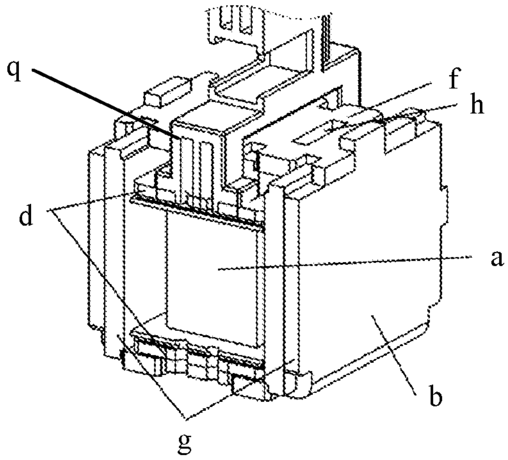
FIG. 14 is a schematic diagram of a first opening group at a top cover according to an embodiment of this application.
Figure 15:
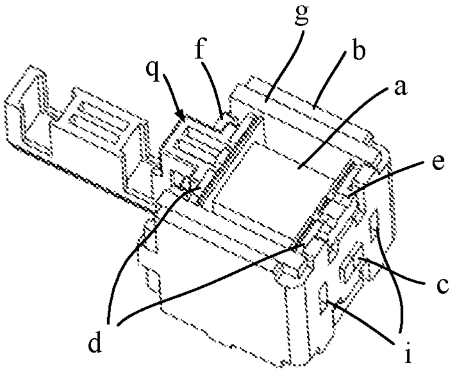
FIG. 15 is a schematic diagram of a second opening group at a yoke iron according to an embodiment of this application.

It should be noted that, a principle of adjusting the retention force is adjusting the retention force by changing parallel magnetic resistance. Refer to FIG. 14. FIG. 14 is a schematic diagram of a retention force adjustment hole at the top cover (f). As shown in FIG. 14, the first movable iron core (d) is attached to the top cover (f), and the magnetic resistance of the top cover is increased by increasing a magnitude of the first opening group (h) of the top cover (f). A magnetic flux moves from the first opening group (h) of the top cover (f) to the first movable iron core (d), which is equivalent to increasing a magnetic flux passing through the first movable iron core (d), thereby improving the retention force. Refer to FIG. 15. FIG. 15 is a schematic diagram of a retention force adjustment hole at the yoke iron (b). As shown in FIG. 15, the second movable iron core (d) is attached to the yoke iron (b), and the magnetic resistance of the yoke iron (b) is increased by increasing a magnitude of the second opening group (i) on the yoke iron (b). A magnetic flux moves from the second opening group (i) to the second movable iron core (d), which is equivalent to increasing a magnetic flux passing through the second movable iron core (d), thereby increasing the retention force.

Figure 16:
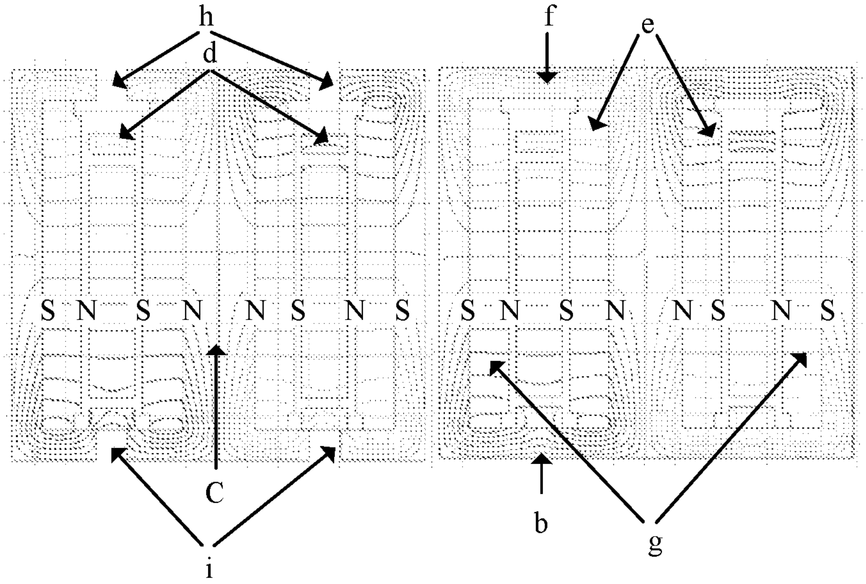
FIG. 16 is a schematic diagram of impact of a first opening group and a second opening group on electromagnetic lines according to an embodiment of this application.

Refer to FIG. 16. The left side of FIG. 16 is a sectional view of a top cover (f) provided with a first opening group (h) and a yoke iron (b) provided with a second opening group (i). The right side of FIG. 16 is a sectional view of a top cover (f) not provided with a first opening group (h) and a yoke iron (b) not provided with a second opening group (i). As shown in FIG. 16, on the left side of FIG. 16, a quantity of electromagnetic lines that pass through the yoke iron (b), pass through the first movable iron core (d) and the second movable iron core (d), and finally return to the yoke iron (b) is significantly greater than that on the right side of FIG. 16. These electromagnetic lines provide a retention force for the first movable iron core (d) and the second movable iron core (d). In the figure on the right side, the electromagnetic lines that pass through the yoke iron (b) almost do not flow through the first movable iron core (d) and the second movable iron core (d), in which case the provided retention force is insufficient.

Further, in this embodiment of this application, the retention force may be adjusted by adjusting magnitudes of the first opening group (h) and the second opening group (i).

The following describes an arrangement manner of permanent magnets in this embodiment of this application.

Figure 17:
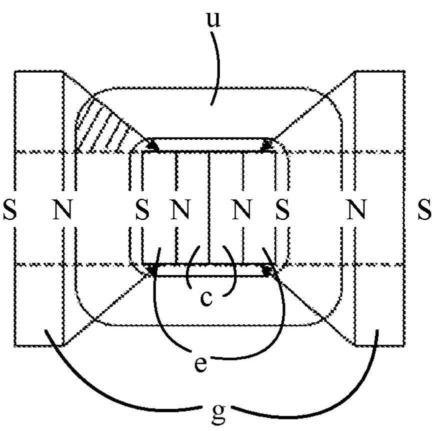
FIG. 17 is a schematic diagram of an arrangement manner of permanent magnets according to an embodiment of this application.

Refer to FIG. 17. FIG. 17 is a schematic diagram of the arrangement manner of permanent magnets according to an embodiment of this application. As shown in the figure, a direction from a top to a bottom of the figure is a length direction. The lengths of a first primary permanent magnet (g) and a second primary permanent magnet (g) are greater than the lengths of a first secondary permanent magnet (e) and a second secondary permanent magnet (e). The left and right two sides are obtained through division by using the static iron core (c) as a center, and the flowing directions of currents in the coil (u) in different sides are opposite. The first primary permanent magnet (g), the second primary permanent magnet (g), the first secondary permanent magnet (e), and the second secondary permanent magnet (e) are responsible for providing a magnetic field. A magnetic field coverage area may be increased additionally by using this permanent magnet arrangement manner. A shadow part in the figure is the increased magnetic field coverage area. It should be noted that only one quarter of the shadow part in the figure is marked. The current in the coil (u) in the figure can be used more efficiently. In addition, under the action of the additional magnetic field and the coil (u), an overall flow direction of the current in the coil is perpendicular to the magnetic field, thereby reducing an eccentricity of the current.

The following describes a movable contact assembly in this embodiment of this application.

Figure 18A:
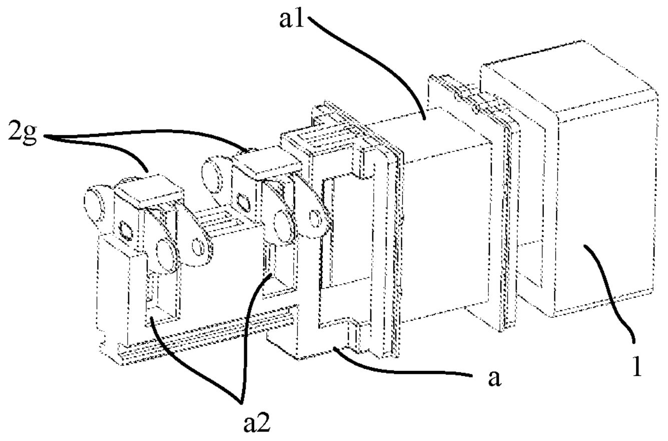
FIG. 18*a* is a schematic diagram of assembly of a movable contact assembly and a driving mechanism according to an embodiment of this application.

Refer to FIG. 18a. In FIG. 18a, the movable contact assembly (2g) is fixedly connected to the driving mechanism (q) through the contact mounting groove (z). FIG. 18a further shows an assembly relationship between the coil (u) and the driving mechanism (q). The assembly can be completed by installing the coil (u) on the coil former (a) of the driving mechanism (q).

Figure 18B:
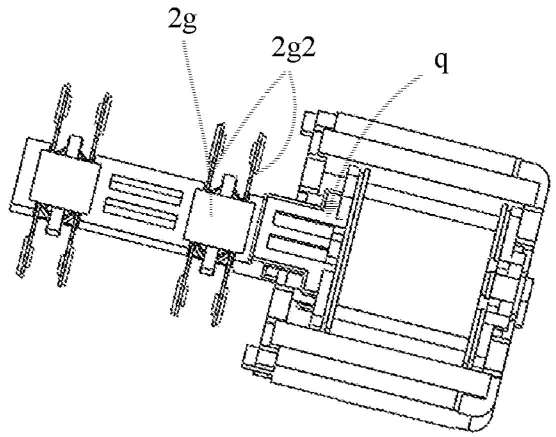
FIG. 18*b* is a schematic diagram of assembly of a movable contact assembly and a driving mechanism from another perspective according to an embodiment of this application.

Refer to FIG. 18b. FIG. 18b is a schematic diagram of assembly of the movable contact assembly (2g) and the driving mechanism (q) from another perspective. As shown in the figure, movable spring plates (2g2) are assembled in the movable contact assembly (2g). The movable spring plates (2g2) are designed in a split-type manner and depend on gas insulation, ensuring reliability of an electrical gap.

The following describes the movable contact assembly (2g) of the relay in an embodiment of this application.

Figure 19:
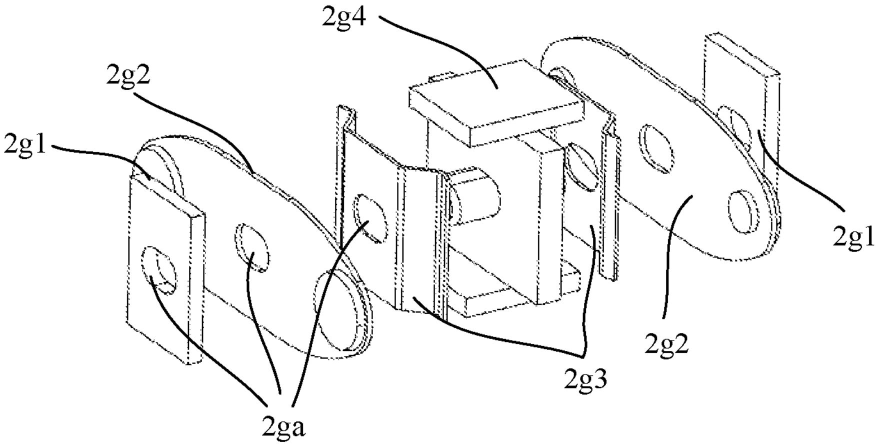
FIG. 19 is a schematic diagram of assembly of a movable contact assembly according to an embodiment of this application.

Refer to FIG. 19. In an embodiment of this application, the movable contact assembly (2g) includes an adjustment block (2g1), movable spring plates (2g2), spring plate supports (2g3), and a middle support (2g4). Diamond-shaped bosses (2gb) are disposed on two sides of the middle support (2g4), and diamond-shaped holes (2ga) are provided on the spring plate supports (2g3), the adjustment block (2g1), and the movable spring plates (2g2) for positioning. An example assembly manner may be: each component is connected in a manner with cooperation of the diamond-shaped bosses (2gb) and the diamond-shaped holes (2ga) in sequence according to positions shown in FIG. 19. It should be noted that the movable spring plate (2g2) in this embodiment of this application may use a flexible deformable material to reduce bounce, and the movable spring plate (2*g*2) is connected to the spring plate support (2*g*3), thereby further reducing the bounce.

The following describes a static contact assembly of the relay in an embodiment of this application.

Figure 20:
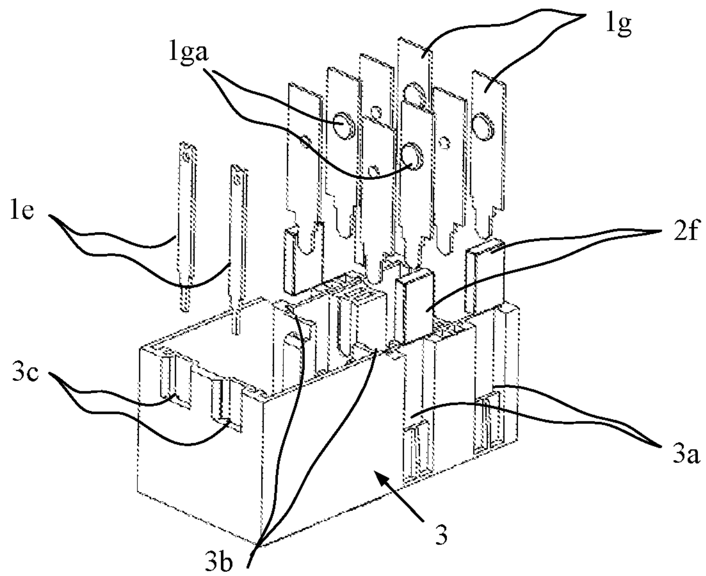
FIG. 20 is a schematic diagram before a static contact assembly and a base are assembled according to an embodiment of this application.

Refer to FIG. 20. FIG. 20 is a schematic diagram of assembly of a static contact assembly and a base according to this embodiment of this application. As shown in the figure, the static contact assembly in embodiments of this application includes a static spring plate (1*g*), a coil pin spring plate (1*e*), and an arc-blown permanent magnet (2*f*), where a static contact (1*ga*) is riveted to the static spring plate (1*g*), the static spring plate is fixed in a first groove (3*b*) on the base (3) in a plug-in manner, a coil pin spring plate (1*e*) is fixed in a second groove (3*c*) on the base (3) in a plug-in manner, and the arc-blown permanent magnet (2*f*) is fixed in a third groove (3*a*) on the base (3) in a plug-in manner, to implement quick arc extinguishing. It should be noted that, the static spring plate (1*g*) in this embodiment of this application is made of a rigid material that is not easy to deform.

Figure 21:
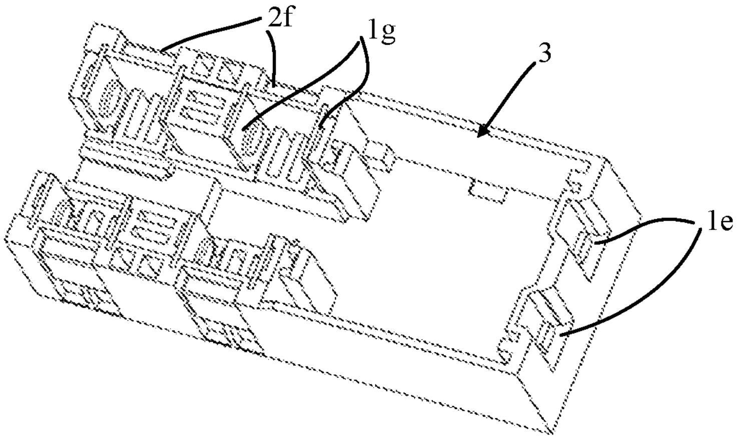
FIG. 21 is a schematic diagram after a static contact assembly and a base are assembled according to an embodiment of this application.

FIG. 21 is a schematic diagram of assembly of the static contact assembly and the base from another perspective according to an embodiment of this application. A specific assembly manner is consistent with the assembly manner described in FIG. 20. Details are not described herein again.

It should be noted that in embodiments of this application, there may be one or more groups of movable contact assemblies and static contact assemblies. This is not specifically limited herein.

Figure 22:
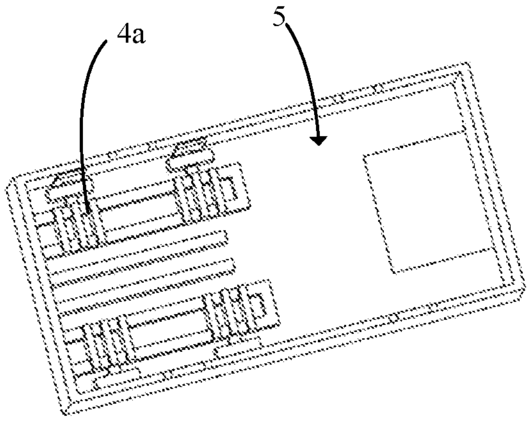
FIG. 22 is a schematic diagram of a structure of an upper cover according to an embodiment of this application.

Refer to FIG. 22. The relay in an embodiment of this application further includes an upper cover (5) and an electric shock system component (4*a*). Aplastic grid plate is disposed on the electric shock system component (4*a*), and may be configured to quickly extinguish an arc.

Figure 23:
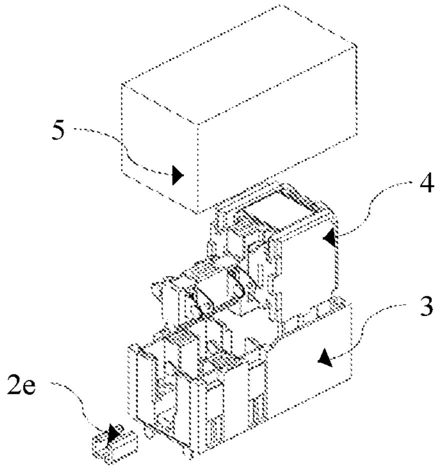
FIG. 23 is a schematic diagram of assembly of an entire relay according to an embodiment of this application.
Figure 24:
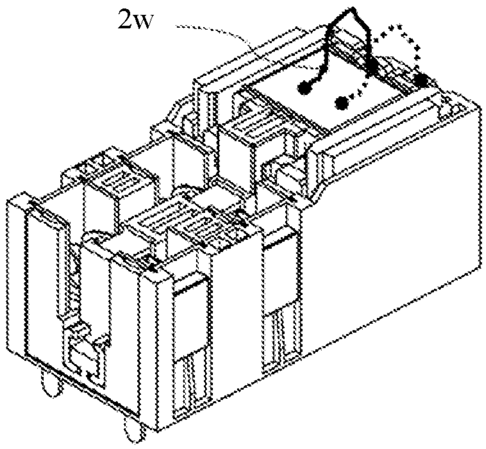
FIG. 24 is a schematic diagram of a structure of a flexible connecting conductor according to an embodiment of this application.
Figure 25:
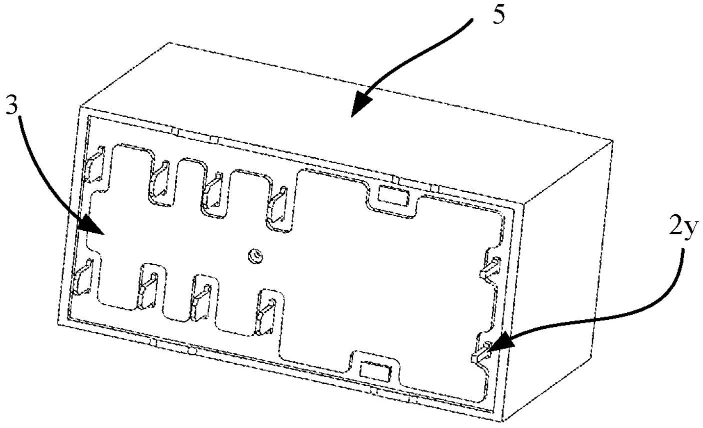
FIG. 25 is a schematic diagram of a structure of a coil pin according to an embodiment of this application.

Refer to FIG. 23. The relay in an embodiment of this application further includes a fastener (2*e*), and may be used as an integrated driving mechanism (4) after the electromagnetic mechanism and the driving mechanism are assembled. An assembling manner of the relay may be: First, the integrated driving mechanism (4) is inserted into the base (3), and then the contact guide rail (x) on the integrated driving mechanism (4) is connected to the base (3) by using the fastener (2*e*), where the fastener (2*e*) may connect and fix the integrated driving mechanism (4) and the base (3), and further provide a guiding function for the integrated driving mechanism (4). Refer to FIG. 24. a flexible connecting conductor (2*w*) may implement current transmission on the coil (u). As a last step, the upper cover (5) is closed. Refer to FIG. 25. After the relay is assembled, a coil pin (2*y*) is led out at the bottom of the base (3).

In an embodiment of this application, the motion of the coil (u) at the position (1) or the position (2) on the coil former (a) may further drive the integrated driving mechanism (4) to move along an axial direction of the contact guide rail (x) on the base (3), to implement contact between the movable spring plate (2g2) and the static spring plate (1g), thereby implementing power supply switching.

In an embodiment of this application, the retention force may be enhanced by using the first opening (h) on the top cover (f) and the second opening (i) on the yoke iron (b), and a magnitude of the retention force may be adjusted by adjusting magnitudes of the first opening (h) and the second opening (h). In an embodiment of this application, the permanent magnet provides the magnetic field, therefore, no additional excitation time is required, and because the coil (u) moves up and down along the coil former (a), a switching time between the switch-off position and the switch-on position can be greatly reduced, thereby implementing high-speed switching of a power supply in the relay.

Figure 26:
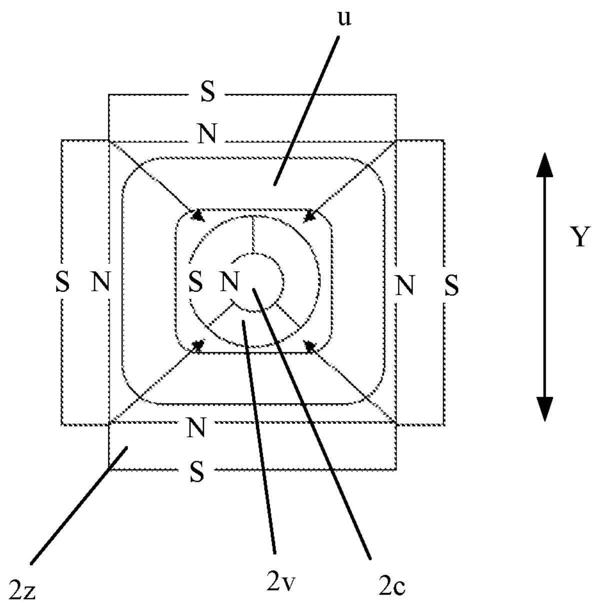
FIG. 26 is a schematic diagram of another structure of an electromagnetic mechanism according to an embodiment of this application.

Refer to FIG. 26. An embodiment of this application further provides another form of an electromagnetic mechanism in a relay. As shown in the figure, the electromagnetic mechanism includes a static iron core (2*c*), a first primary permanent magnet (2*z*), a second primary permanent magnet (2*z*), a third primary permanent magnet (2*z*), a fourth primary permanent magnet (2*z*), a first secondary permanent magnet (2*v*), a second secondary permanent magnet (2*v*), and a third secondary permanent magnet (2*v*). The first primary permanent magnet (2*z*), the second primary permanent magnet (2*z*), the third primary permanent magnet (2*z*), and the fourth primary permanent magnet (2*z*) belong to a primary permanent magnet group. The first secondary permanent magnet (2*v*), the second secondary permanent magnet (2*v*), and the third secondary permanent magnet (2*v*) belong to a secondary permanent magnet group. The electromagnetic mechanism further includes a yoke iron (b) and a top cover (f), where the static iron core (2*c*), the first primary permanent magnet (2*z*), the second primary permanent magnet (2*z*), the third primary permanent magnet (2*z*), the fourth primary permanent magnet (2*z*), the first secondary permanent magnet (2*v*), the second secondary permanent magnet (2*v*), the third secondary permanent magnet (2*v*), and the top cover (f) are riveted to the yoke iron (b). A specific riveting manner is similar to the riveting manner shown in FIG. 3*a* to FIG. 3*c*, and details are not described herein again.

As shown in FIG. 26, the first secondary permanent magnet (2*v*), the second secondary permanent magnet (2*v*), and the third secondary permanent magnet (2*v*) are disposed around the static iron core (2*c*). The first primary permanent magnet (2*z*), the second primary permanent magnet (2*z*), the third primary permanent magnet (2*z*), and the fourth primary permanent magnet (2*z*) are disposed around the first secondary permanent magnet (2*v*), the second secondary permanent magnet (2*v*), and the third secondary permanent magnet (2*v*). In addition, the first primary permanent magnet (2*z*), the second primary permanent magnet (2*z*), the third primary permanent magnet (2*z*), and the fourth primary permanent magnet (2*z*) have a same length. The first secondary permanent magnet (2*v*), the second secondary permanent magnet (2*v*), and the third secondary permanent magnet (2*v*) have a same length. The length of the first primary permanent magnet (2*z*) is greater than the length of the first secondary permanent magnet (2*v*). The first primary permanent magnet (2*z*), the second primary permanent magnet (2*z*), the third primary permanent magnet (2*z*), and the fourth primary permanent magnet (2*z*) are perpendicularly disposed. "S" and "N" shown in the figure are magnetic poles of the permanent magnets, and "N" poles of all permanent magnets in the figure face the static iron core (2*c*). By using such an electromagnetic mechanism structure arrangement, the coil (u) can be entirely enclosed by the magnetic field provided by the permanent magnet, thereby improving utilization efficiency of the magnetic field to a greater extent, eliminating contact between the coil (u) and another component of the relay, and improving service life and reliability of the electromagnetic mechanism.

It should be noted that a direction to which an arrow "Y" in the figure points is a length direction of the foregoing permanent magnet.

It should be noted that, in an example application, the primary permanent magnets in the electromagnetic mechanism may not include the first primary permanent magnet (2*z*), the second primary permanent magnet (2*z*), the third primary permanent magnet (2*z*), and the fourth primary permanent magnet (2*z*), and may further include another quantity of primary permanent magnets, or permanent magnets of other shapes, for example, a circular permanent magnet, as long as the coil (u) can be totally enclosed by a provided magnetic field, which is not specifically limited. The secondary permanent magnet may also be in another form, for example, a square secondary permanent magnet may be used, provided that the static iron core (2*c*) can be enclosed by the secondary permanent magnet. The coil (u) may also be a circular coil or a square coil, which is not specifically limited herein.

Specifically, assembly of the electromagnetic mechanism and another assembly of the relay is similar to that in the foregoing embodiment, and details are not described herein again.

Figure 27:
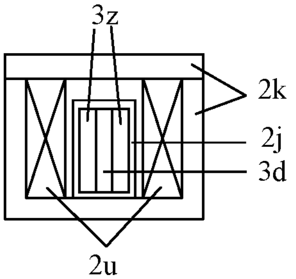
FIG. 27 is a schematic diagram of still another structure of an electromagnetic mechanism according to an embodiment of this application.

An embodiment of this application further provides another relay. The relay includes an electromagnetic mechanism. Refer to FIG. 27. As shown in the figure, the electromagnetic mechanism includes a first permanent magnet (3*z*), a second permanent magnet (3*z*), a magnetic conductive material housing (2*k*), an insulation receptacle (2*j*), a movable iron core (3*d*), a first coil (3*u*), and a second coil (3*u*). A magnetic conduction direction of the first permanent magnet (3*z*) is opposite to a magnetic conduction direction of the second permanent magnet (3*z*). A cavity is provided inside the insulation receptacle (2*j*). The first permanent magnet (3*z*) and the second permanent magnet (3*z*) are disposed in the cavity provided inside the insulation receptacle (2*j*). A bottom of the insulation receptacle (2*j*) is provided with a through hole, and the movable iron core (3*d*) passes through the through hole. In addition, a bottom of the movable iron core (3*d*) is fixedly connected to the magnetic conductive material housing (2*k*), the first coil (3*u*) and the second coil (3*u*) are disposed at two sides of the insulation receptacle (2*j*), and the first coil (3*u*), the second coil (3*u*), and the insulation receptacle (2*j*) are all disposed in the magnetic conductive material housing (2*k*). A top of the magnetic conductive material housing (2*k*) is provided with at least a first opening and a second opening, and a bottom of the magnetic conductive material housing (2*k*) is provided with at least a third opening and a fourth opening. The movable iron core (3*d*) may provide a magnetic circuit for the first permanent magnet (3*z*). The second permanent magnet (3*z*), and the first permanent magnet (3*z*) and the second permanent magnet (3*z*) may drive the insulation receptacle (2*j*) under the action of the first coil (3*u*) and the second coil (3*u*) to move up and down along the movable iron core inside the magnetic conductive material housing (2*k*). The insulation receptacle (2*j*) may provide a buffer for the first permanent magnet (3*z*) and the second permanent magnet (3*z*), to prevent the first permanent magnet (3*z*) and the second permanent magnet (3*z*) from being broken or demagnetized.

In FIG. 27, no coil is disposed on a driving mechanism of the relay. In addition, the driving mechanism of the relay and an assembly relationship between the driving mechanism and the electromagnetic mechanism are similar to those in the embodiment corresponding to FIG. 3*a* to FIG. 3*c*. Details are not described herein again.

According to the electromagnetic mechanism provided in this embodiment of this application, the coil does not need to move, so that a case in which a copper wire on the coil is broken can be avoided, and reliability of the mechanism is greatly improved.

Figure 28:
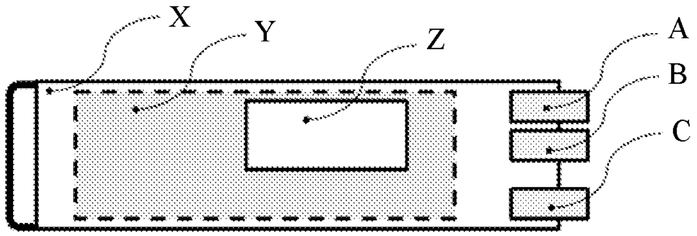
FIG. 28 is a schematic diagram of a structure of a power distributor box according to an embodiment of this application.

An embodiment of this application further provides a power distribution box. The power distribution box is configured to dispose the relays described in embodiments of this application. Refer to FIG. 28. The power distribution box includes a structure member (X), a driving board (Z), a power board (Y), an input power connector (A), an input voltage connector (B), and an input voltage connector (C). The relay may be fixedly mounted on the structure member (X), and the driving board (Z) is configured to supply power to a coil (u) in the relay. By changing a current direction in the coil (u), the relay can be switched between a switch-off position and a switch-on position. The power board (Y) is connected to a main loop of the relay. The input power connector (A) is configured to provide an input power for the relay, and the input voltage connector (C) is configured to provide an input voltage for the relay.

An embodiment of this application further provides a communication device. The communication device includes the foregoing power distribution box and an electric device. The electric device may be a switch, a router, or a server, or may be another electric device. This is not specifically limited herein. The power distribution box may be configured to switch a power status of the electric device.

What is claimed is:

1. A relay comprising:

an electromagnetic mechanism;

a first movable iron core and a second movable iron core; and a coil former;

wherein the electromagnetic mechanism comprises a yoke iron, a top cover, a static iron core, a primary permanent magnet group, and a secondary permanent magnet group;

the static iron core, the top cover, the primary permanent magnet group, and the secondary permanent magnet group are connected to the yoke iron via a fixed connection;

the top cover is provided with a first opening group, the first opening group is provided at a position at which the top cover is configured to be in contact with the first movable iron core, and the first opening group comprises at least one first sub-opening;

the yoke iron is provided with a second opening group, the second opening group is provided at a position at which the yoke iron is configured to be in contact with the second movable iron core, and the second opening group comprises at least one second sub-opening; and a coil is disposed on the coil former, a cavity is provided inside the coil former, and the static iron core and the secondary permanent magnet group are disposed in the cavity.

2. The relay according to claim 1, wherein the fixed connection is a riveting connection.

3. The relay according to claim 1, wherein the top cover comprises a first contact part and a second contact part, the first contact part and the second contact part are configured to be in contact with the first movable iron core, the first contact part is provided with a first sub-opening group, the second contact part is provided with a second sub-opening group, the first sub-opening group comprises at least one first sub-opening, the second sub-opening group comprises at least one first sub-opening, and the first sub-opening group and the second sub-opening group are comprised in the first opening group; and the yoke iron comprises a third contact part and a fourth contact part, the third contact part and the fourth contact part are configured to be in contact with the second movable iron core, the third contact part is provided with a third sub-opening group, the fourth contact part is provided with a fourth sub-opening group, the third sub-opening group comprises at least one second sub-opening, the fourth sub-opening group comprises at least one second sub-opening, and the third sub-opening group and the fourth sub-opening group are comprised in the second opening group.

4. The relay according to claim 1, wherein the primary permanent magnet group comprises a first primary permanent magnet and a second primary permanent magnet, the secondary permanent magnet group comprises a first secondary permanent magnet and a second secondary permanent magnet, the first secondary permanent magnet is attached to one side of the static iron core, the second secondary permanent magnet is attached to the other side of the static iron core, the first primary permanent magnet is attached to an inner wall of one side of the yoke iron, the first primary permanent magnet is disposed on one side of the static iron core, the second primary permanent magnet is attached to an inner wall of the other side of the yoke iron, and the second primary permanent magnet is disposed on the other side of the static iron core; and the first primary permanent magnet and the second primary permanent magnet have a same length, magnetic conduction directions of the first primary permanent magnet and the second primary permanent magnet are opposite, the first secondary permanent magnet and the second secondary permanent magnet have a same length, magnetic conduction directions of the first secondary permanent magnet and the second secondary permanent magnet are opposite, and magnetic conduction directions of the first primary permanent magnet and the first secondary permanent magnet are the same.

5. The relay according to claim 4, wherein the length of the first primary permanent magnet is greater than the length of the first secondary permanent magnet, and the length of the secondary permanent magnet is equal to a length of the static iron core.

6. The relay according to claim 3, wherein the secondary permanent magnet group is disposed around the static iron core, the primary permanent magnet group is disposed around the secondary permanent magnet group, target magnetic poles of the secondary permanent magnet group and the primary permanent magnet group face the static iron core, and the target magnetic poles are S poles or N poles;

a length of a permanent magnet in the primary permanent magnet group is greater than a length of a permanent magnet in the secondary permanent magnet group.

7. The relay according to claim 5, wherein the relay further comprises a driving mechanism, the driving mechanism comprises the first movable iron core, the second movable iron core, the coil former, a contact mounting groove, and a contact guide rail, the first movable iron core is disposed on one side of the coil former, the second movable iron core is disposed on the other side of the coil former, and the driving mechanism is integrally formed.

8. The relay according to claim 5, wherein the relay further comprises a first driving mechanism, a second driving mechanism, and a connecting member, the first driving mechanism comprises a contact mounting groove, a contact guide rail, and a first connection hole, the second driving mechanism comprises the first movable iron core, the second movable iron core, the coil former, and a second connection hole, and the connecting member is inserted into the first connection hole and the second connection hole, and is fixedly connected to the first driving mechanism and the second driving mechanism; and the first driving mechanism and the second driving mechanism are integrally formed.

9. The relay according to claim 7, wherein the relay further comprises a movable spring plate, the movable spring plate is made of a flexible deformable material.

10. The relay according to claim 7, wherein the relay further comprises a static spring plate, the static spring plate is made of a rigid material.

11. A communication device comprising:

a power distribution box; and an electric device;

wherein the power distribution box is configured to switch a power status of the electric device;

wherein the power distribution box comprises a driving board, the power distribution box is configured to dispose a relay comprising an electromagnetic mechanism, the electromagnetic mechanism comprises a yoke iron, a top cover, a static iron core, a primary permanent magnet group, and a secondary permanent magnet group, and the relay further comprises a first movable iron core and a second movable iron core;

wherein the static iron core, the top cover, the primary permanent magnet group, and the secondary permanent magnet group are connected to the yoke iron via a fixed connection;

wherein the top cover is provided with a first opening group, the first opening group is provided at a position at which the top cover is configured to be in contact with the first movable iron core, and the first opening group comprises at least one first sub-opening;

wherein the yoke iron is provided with a second opening group, the second opening group is provided at a position at which the yoke iron is configured to be in contact with the second movable iron core, and the second opening group comprises at least one second sub-opening; and wherein the relay further comprises a coil former, a coil is disposed on the coil former, a cavity is provided inside the coil former, and the static iron core and the secondary permanent magnet group are disposed in the cavity; and wherein the driving board is configured to supply power to the coil.

12. The communication device according to claim 11, wherein the fixed connection is a riveting connection.

13. The communication device according to claim 11, wherein the top cover comprises a first contact part and a second contact part, the first contact part and the second contact part are configured to be in contact with the first movable iron core, the first contact part is provided with a first sub-opening group, the second contact part is provided with a second sub-opening group, the first sub-opening group comprises at least one first sub-opening, the second sub-opening group comprises at least one first sub-opening, and the first sub-opening group and the second sub-opening group are comprised in the first opening group; and the yoke iron comprises a third contact part and a fourth contact part, the third contact part and the fourth contact part are configured to be in contact with the second movable iron core, the third contact part is provided with a third sub-opening group, the fourth contact part is provided with a fourth sub-opening group, the third sub-opening group comprises at least one second sub-opening, the fourth sub-opening group comprises at least one second sub-opening, and the third sub-opening group and the fourth sub-opening group are comprised in the second opening group.

14. The communication device according to claim 11, wherein the primary permanent magnet group comprises a first primary permanent magnet and a second primary permanent magnet, the secondary permanent magnet group comprises a first secondary permanent magnet and a second secondary permanent magnet, the first secondary permanent magnet is attached to one side of the static iron core, the second secondary permanent magnet is attached to the other side of the static iron core, the first primary permanent magnet is attached to an inner wall of one side of the yoke iron, the first primary permanent magnet is disposed on one side of the static iron core, the second primary permanent magnet is attached to an inner wall of the other side of the yoke iron, and the second primary permanent magnet is disposed on the other side of the static iron core; and the first primary permanent magnet and the second primary permanent magnet have a same length, magnetic conduction directions of the first primary permanent magnet and the second primary permanent magnet are opposite, the first secondary permanent magnet and the second secondary permanent magnet have a same length, magnetic conduction directions of the first secondary permanent magnet and the second secondary permanent magnet are opposite, and magnetic conduction directions of the first primary permanent magnet and the first secondary permanent magnet are the same.

15. The communication device according to claim 14, wherein the length of the first primary permanent magnet is greater than the length of the first secondary permanent magnet, and the length of the secondary permanent magnet is equal to a length of the static iron core.

16. The communication device according to claim 13, wherein the secondary permanent magnet group is disposed around the static iron core, the primary permanent magnet group is disposed around the secondary permanent magnet group, target magnetic poles of the secondary permanent magnet group and the primary permanent magnet group face the static iron core, and the target magnetic poles are S poles or N poles;

a length of a permanent magnet in the primary permanent magnet group is greater than a length of a permanent magnet in the secondary permanent magnet group.

17. The communication device according to claim 15, wherein the relay further comprises a driving mechanism, the driving mechanism comprises the first movable iron core, the second movable iron core, the coil former, a contact mounting groove, and a contact guide rail, the first movable iron core is disposed on one side of the coil former, the second movable iron core is disposed on the other side of the coil former, and the driving mechanism is integrally formed.

18. The communication device according to claim 15, wherein the relay further comprises a first driving mechanism, a second driving mechanism, and a connecting member, the first driving mechanism comprises a contact mounting groove, a contact guide rail, and a first connection hole, the second driving mechanism comprises the first movable iron core, the second movable iron core, the coil former, and a second connection hole, and the connecting member is inserted into the first connection hole and the second connection hole, and is fixedly connected to the first driving mechanism and the second driving mechanism; and the first driving mechanism and the second driving mechanism are integrally formed.

19. The communication device according to claim 17, wherein the relay further comprises a movable spring plate and a static spring plate, the movable spring plate is made of a flexible deformable material, and the static spring plate is made of a rigid material.

20. The communication device according to claim 18, wherein the relay further comprises a movable spring plate and a static spring plate, the movable spring plate is made of a flexible deformable material, and the static spring plate is made of a rigid material.

* * * * *